Oct. 2, 1962    J. A. JOHNSON    3,056,863
APPLIANCE CORD REEL
Filed Nov. 16, 1959

Jess A. Johnson
INVENTOR.

BY

ATTORNEY

United States Patent Office 3,056,863  
Patented Oct. 2, 1962

3,056,863  
APPLIANCE CORD REEL  
Jess A. Johnson, 108 Hensley Drive, Grand Prairie, Tex.  
Filed Nov. 16, 1959, Ser. No. 853,077  
2 Claims. (Cl. 191—12.4)

This invention relates to an appliance cord and reel, and it concerns more particularly the combination of an extension cord and a reel therefor, for attachment of electrical appliances, such as electric razors and the like, to a source of electricity.

An object of the invention is to provide, in combination with an electrical cord comprising a pair of wires arranged in juxtaposed, parallel relation to each other, a spring actuated reel adapted to have the cord wound thereon when not in use, and from which the cord is adapted to be unwound as needed.

Another object of the invention is to provide, in combination with an electrical cord, a spring actuated reel therefor which is of simple, rugged construction, is adapted to be fabricated inexpensively, and is efficient in operation and durable in use.

The invention will be readily understood by referring to the following description and the accompanying drawing, in which:

FIGURE 1 is a perspective view of an appliance cord, and a reel therefor, embodying the invention, showing one end of the reel, with the cord in its retracted position, in which the entire length thereof is wound on the reel, and showing a terminal plug which is attached to one end of the cord, and is connected by an articulated joint to the adjacent end of the spool of the reel, whereby it is movable pivotally relative thereto, in its extended position, in which it is aligned with the axis of the reel.

Figure 1:
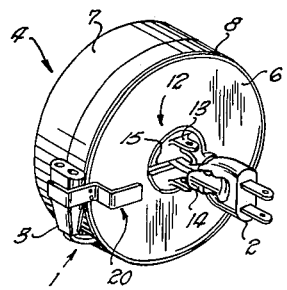

Referring to the drawing, the numeral 1 designates an electrical cord comprising a pair of wires arranged in juxtaposed, parallel relation to each other. The cord 1 has male and female terminal plugs 2 and 3 connected to opposite ends thereof.

A spring actuated reel, on which the cord 1 is wound, as hereinafter described, has a cylindrical housing which is designated generally by the numeral 4. The housing 4 includes a pair of complementary circular end portions 5 and 6 having peripheral flanges 7 and 8, which are internally threaded whereby they are connected to opposite sides of a peripherally threaded disc 9, in mutually opposed relation to each other. The disc 9 forms a partition dividing the housing 4 into compartments 10 and 11 positioned on opposite sides thereof.

A spool 12, which is disposed partly within the housing 4, concentrically and coaxially thereof, extends through a central opening therefor in the disc 9, whereby it is disposed partly in each of the compartments 10 and 11.

One end of the spool 12 extends outwardly through a central opening therefor in the end portion 6 of the housing 4, and has a pair of integral lugs 13 thereon whereby it is pivotally connected to a fitting 14, which in turn is pivotally connected to the male terminal plug 2 to form a universal joint.

The spool 12 is journaled in the openings therefor in the disc 9 and the end portion 6, whereby it is rotatable relative to the housing 4.

The electrical cord 1, which is connected at one end to the terminal plug 2, extends through the fitting 14, and through a passage 15 therefor which extends radially outwardly through the spool 12 from its center to the peripheral surface of a portion 16 thereof, on which the cord 1 is wound. The portion 16 of the spool 12 is of reduced diameter, and is disposed within the compartment 11, between the adjacent end portion 6 and the disc 9.

The spool 12 has oppositely facing external shoulders 17 and 18 thereon for abutting engagement with the end portion 6 and the disc 9, respectively, whereby longitudinal movement of the spool 12 relative to the housing 4 is prevented.

One end of the cord 1 is passed through an opening 19 therefor in the peripheral flange 8, and has the female terminal plug 3 connected thereto, exteriorly of the housing 4.

Figure 2:
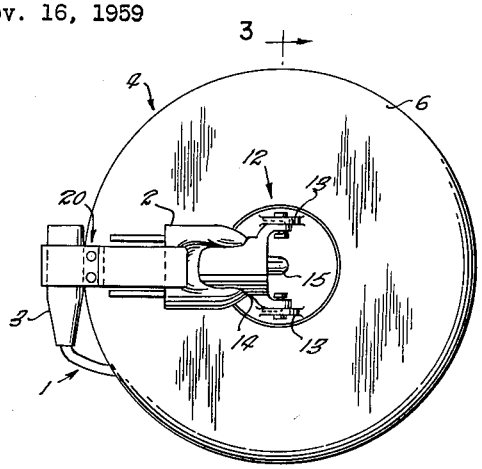
FIGURE 2 is an end view, on an enlarged scale, showing the end of the reel shown in FIGURE 1, and showing the terminal plugs which are attached to opposite ends of the cord in their retracted positions, in which they are securely anchored to the housing of the reel.
Figure 3:
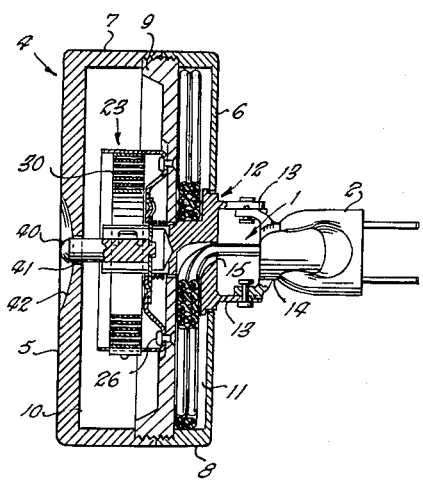
FIGURE 3 is a longitudinal view, partly in section taken on the line 3—3 of FIGURE 2, and showing one of the terminal plugs in the position shown in FIGURE 1.
Figure 4:
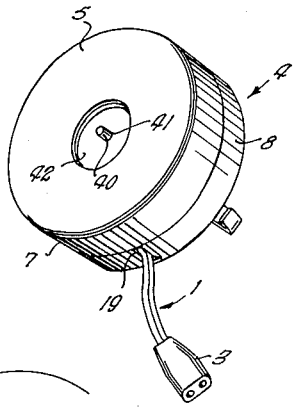
FIGURE 4 is a perspective view showing the end of the reel opposite the end shown in FIGURE 1, and showing the cord in a partly extended position, in which a portion thereof is unwound from the reel.
Figure 5:
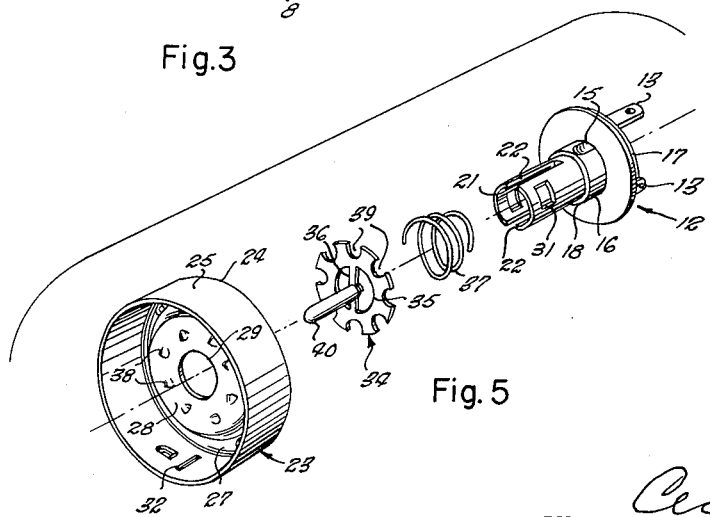
FIGURE 5 is an exploded perspective view, on an enlarged scale, showing parts of the reel in their detached positions relative to each other.

A clip 20, which is attached to the end portion 6, exteriorly thereof, is engageable with the terminal plugs 2 and 3, in the retracted positions thereof, as shown in FIGURE 2, whereby the terminal plugs 2 and 3 are securely anchored to the housing 4.

A portion 21 of the spool 12, which is disposed within the compartment 10, between the adjacent end portion 5 and the disc 9, is of hollow, cylindrical construction, and is open at its free end, which faces the end portion 5. The portion 21 has longitudinal slots 22 in opposite sides thereof, beginning at its free end.

A cylindrical spring housing 23, which is open at one end and has a closed end 24 and a peripheral wall 25, surrounds the portion 21 of the spool 12 and is attached to the disc 9, as hereinafter described, with its open end facing the end portion 5, whereby the spring housing 23 is secured against rotation relative to the housing 4.

The spring housing 23 is attached to the disc 9 by a plurality of circumferentially spaced rivets 26, which are passed through openings therefor in an annular portion 27 of its closed end 24 immediately adjacent its peripheral wall 25. The closed end 24 of the spring housing 23 has a depressed central portion 28, which is spaced apart from the disc 9 and has an opening 29 therein through which the portion 21 of the spool 12 is passed.

A spring 30, which is coiled about the portion 21 of the spool 12, is connected at one end to the portion 21, as at 31, and at its opposite end to the peripheral wall 25 of the spring housing 23, as at 32. The spring 30 acts on the portion 21 and the spring housing 23 to resist rotation of the spool 12 relative to the housing 4, whereby the cord 1 is unwound.

A spider 34 has a central opening 35, through which the portion 21 of the spool 12 is passed, and has an integral web portion 36 which extends diametrically across the opening 35 and is received in the slots 22, whereby the spider 34 is rotatable with the spool 12. The spider 34 is received in the space between the disc 9 and the depressed central portion 28 of the closed end 24 of the spring housing 23.

A compression spring 37, which surrounds the portion 21 of the spool 12 and is positioned between the disc 9 and the spider 34, acts on the disc 9 and the spider 34 whereby the spider 34 is yieldably urged longitudinally relative to the portion 21 of the spool 12, in the direction of the spring housing 23, and is adapted to frictionally engage the depressed central portion 28 thereof.

A plurality of circumferentially spaced projections 38, which are formed on the depressed central portion 28 of the spring housing 23, facing the spider 34, are receivable in corresponding indentations 39 formed in the peripheral edge of the spider 34, whereby the spool 12 is adapted to be secured against rotation relative to the housing 4.

A pin 40, which is connected at one end to the web portion 36 of the spider 34, centrally thereof, and is arranged concentrically and coaxially relative to the portion 21 of the spool 12, extends outwardly through an opening 41 therefor in the adjacent end portion 5 of the housing 4. A concave depression 42 is formed in the exterior surface of the end portion 5 surrounding the opening 41. The spider 34 is adapted to be disengaged from the spring housing 23, whereby the spool 12 is rotatable relative to the housing 4, upon depressing the pin 40.

The invention may be modified in various ways without departing from the spirit and scope thereof.

What is claimed is:

1. The combination of an electrical cord and a reel therefor, the reel comprising a cylindrical housing having a central partition dividing it into two compartments positioned adjacent opposite ends thereof, a spool rotatable in the housing and having the cord wound thereon, the spool being disposed partly in each of the compartments and extending outwardly beyond one end of the housing, the cord being wound on a portion of the spool which is disposed wholly within one of the compartments, between the partition and said one end of the housing, a cylindrical spring housing, open at one end, disposed within the opposite compartment, loosely surrounding the spool and having its closed end secured to the partition, a coil spring acting on the spool and the spring housing to resist rotation of the spool relative to the housing, the portion of the spool which is disposed within the last mentioned compartment being of hollow, cylindrical construction and having an open end facing the adjacent end of the housing, and having longitudinal slots in opposite sides thereof, the spring housing having a depressed central portion, surrounding the spool and spaced apart from the partition, having a plurality of circumferentially spaced projections thereon, a spider having a central opening therein surrounding the slotted portion of the spool and having a web portion extending across said opening and engageable with the slots of the spool, whereby the spider is rotatable with the spool and is movable longitudinally relative thereto, the spider being disposed between the depressed central portion of the spring housing and the partition and having indentations in its peripheral edge engageable with the projections of the spring housing to prevent rotation of the spool in either direction relative to the housing, a compression spring surrounding the spool, between the spider and the partition, biasing the spider in frictional engagement with the spring housing, and a depressable pin having one of its ends connected to the spider, centrally thereof, and extending outwardly through an opening therefor in the last mentioned end of the housing.

2. The structure of claim 1, the cord having male and female terminal plugs connected to opposite ends thereof, a fitting pivotally connected at its ends to the spool and to one of the terminal plugs, the adjacent end portion of the cord being passed through the fitting and through a passage in the spool extending radially outwardly from its center to the peripheral surface thereof, the opposite end portion of the cord being passed through an opening therefor in the peripheral wall of the housing and having the other of the terminal plugs connected thereto, exteriorly of the housing, and a spring clip mounted on the housing, exteriorly thereof, engageable with the terminal plugs in retracted positions thereof whereby the terminal plugs are adapted to be securely anchored to the housing.

References Cited in the file of this patent

UNITED STATES PATENTS

| 1,027,634 | Williamson | May 28, 1912 |
| 1,256,016 | Henderson | Feb. 12, 1918 |
| 2,013,733 | Murphy | Sept. 10, 1935 |
| 2,305,101 | O'Brien | Dec. 15, 1942 |

FOREIGN PATENTS

| 738,942 | France | Oct. 24, 1932 |
| 603,390 | Germany | Sept. 29, 1934 |
| 805,653 | Germany | Feb. 18, 1952 |